April 29, 1952 V. P. FISHER ET AL 2,594,413
SAW-TOOTH CONDITIONING DEVICE
Filed Nov. 3, 1950 2 SHEETS—SHEET 1

V. P. Fisher
L. H. Poole
INVENTORS
BY
ATTORNEYS.

April 29, 1952 V. P. FISHER ET AL 2,594,413
SAW-TOOTH CONDITIONING DEVICE
Filed Nov. 3, 1950 2 SHEETS—SHEET 2
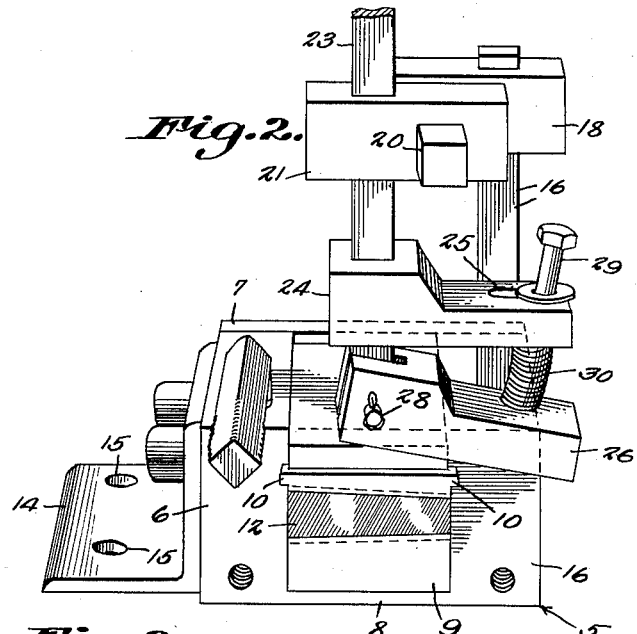
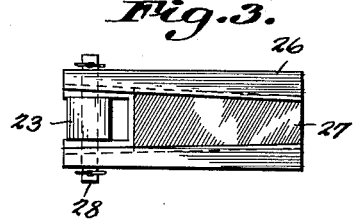
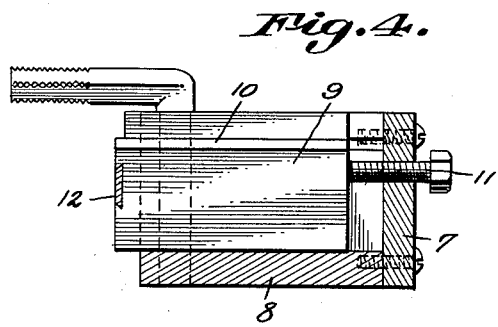
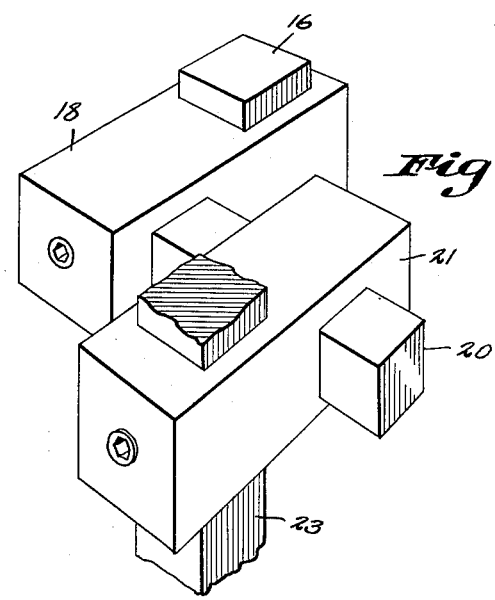
V. P. Fisher
L. H. Poole
INVENTORS Patented Apr. 29, 1952

2,594,413

UNITED STATES PATENT OFFICE 2,594,413

SAW-TOOTH CONDITIONING DEVICE

Vernard P. Fisher and Louis H. Poole,
Tuscaloosa, Ala.

Application November 3, 1950, Serial No. 193,964

1 Claim. (Cl. 76—47)

This invention relates to a device which operates in conjunction with the usual grinding wheel used in sharpening saw teeth, for removing the bur at the side edges of the teeth, as well as at the cutting edges of the teeth, thereby providing smooth surfaces for contact with the material being sawed to reduce friction to the minimum, and lessen the chances of overheating the saw while in use.

Another object of the invention is to provide means for dressing the saw teeth after they have been sharpened by the usual rotary grind stone, so that the teeth will have identical spread and will be of a uniform size and shape to insure the efficient operation of the saw.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings

Fig. 2 is a side elevational view of the attachment.

Fig. 3 is a bottom view of the pivoted file carrying member which operates to file the cutting edges of the teeth of a band saw.

Fig. 4 is a sectional view through the adjustable file holder used in filing the inner side edges of the teeth.

Fig. 5 is a fragmental perspective view illustrating a portion of the frame of the attachment.

Figure 1:
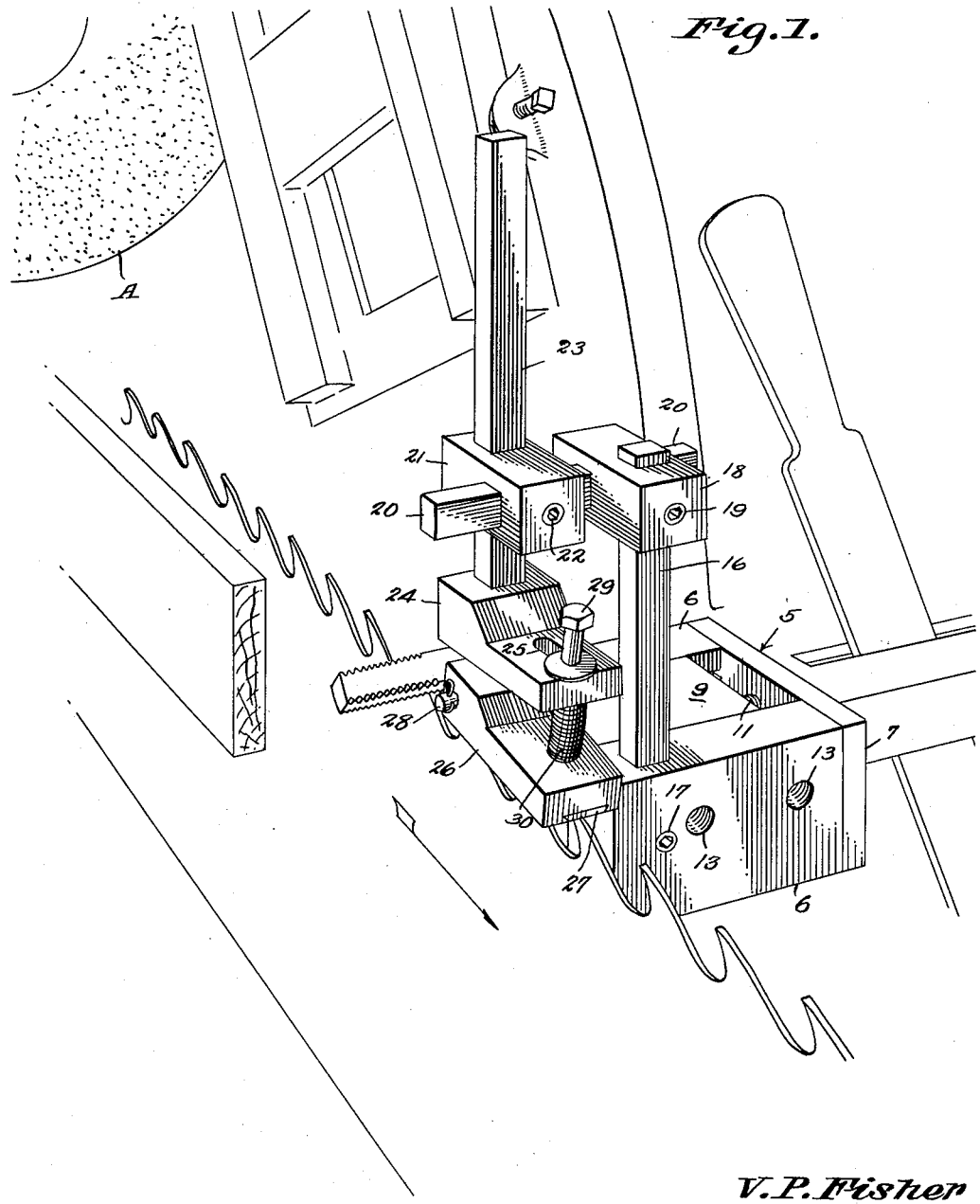
Figure 1 is a fragmental perspective view, illustrating a saw tooth dressing device, constructed in accordance with the invention, as mounted on the frame of a saw tooth grinding machine.

Referring to the drawings in detail, the attachment comprises a body portion indicated generally by the reference character 5, the body portion having spaced side members 6 connected at their rear ends by the bar 7, the side members 6 being integral with the bottom 8 providing a housing and guide for the file block 9 which is constructed to exactly fit within the space between the side members 6.

The inner surfaces of the side members 6 are provided with longtudinal grooves in which the laterally extended ribs 10 of the file block 9 move, there being provided a set bolt 11 which extends through a threaded bore in the bar 7, the bolt 11 engaging the rear edge of the file block 9, to move the block forwardly for a proper adjustment.

The front edge of the file block 9 is provided with a dovetail-shaped groove in which the file section 12 which has beveled side edges, fits, the side edges of the file section 12 converging towards one end of the file section so that when in use, the file section 12 will be forced rearwardly by its contact with the saw teeth being finished, thereby providing a tight fit between the file piece and its block.

Threaded openings 13 are formed in the spaced side members 6, and these threaded openings accommodate securing bolts which pass therethrough into engagement with the side edges of the file block 9, securing the file block 9 in its adjusted positions.

The reference character 14 indicates an angle plate, which is bolted to the side edge of one of the side members 6, the angle plate 14 having openings 15 for the reception of bolts by means of which the attachment may be secured to the frame of a band saw tooth filing machine for simultaneous operation with the band saw tooth grinder.

One of the side members 6 is formed with a rectangular opening, in which the post 16 is positioned, there being provided a securing screw 17 that extends transversely through the side member 6 in which the post 16 operates, for engagement with the post 16 to secure the post 16 in its proper adjusted position. The reference character 18 indicates a block having a rectangular opening, which is held in horizontal position on the upper end of the post 16, the screw 19 holding the block 18 in its positions of adjustment on the post 16. This block 18 also has a rectangular opening adjacent to one end thereof, the latter rectangular opening being disposed at right angles with respect to the rectangular opening in the block 18 in which the post 16 is moved.

A horizontally disposed bar 20 operates through the latter rectangular opening of the block 18, the bar 20 also passing through a rectangular horizontally disposed opening in the block 21, the block 21 having the screw 22 operating in an opening in one end of the block 21, the screw engaging the bar 20 to hold the block 21 in position on the bar 20.

This block 21 is also provided with a vertically disposed rectangular opening in which the post 23 is disposed, the post 23 being secured in an opening formed in the bar 24 that is horizontally disposed and provided with an elongated opening 25. The reference character 26 indicates a pivoted file block which is provided with a dovetailed groove in its lower surface in which the file piece 27 is disposed, the side edges of the file piece 27 being beveled to fit within the dove-tailed groove of the block 26, securely holding the file piece in position.

The post 23 is provided with a transversely disposed opening in which the pivot pin 28 is positioned, the pivot pin 28 passing through openings formed in the file block 26, the file block 26 having a slot in one end thereof of a width to accommodate the lower end of the post 23.

Extending upwardly from the pivoted file block 26, is the bolt 29 which passes through the elongated opening 25 of the bar 24, the bolt providing a guide for the pivoted file block 26 in its vertical movements. The reference character 30 indicates a coiled spring which rests on the upper surface of the block 26 and engages the lower surface of the bar 24, normally exerting downward pressure on the block 26, to urge the file piece 27 carried thereby, into contact with the cutting edges of the teeth moving thereunder, with such a degree as to file the bur which is formed thereon during the grinding operation, from the tooth.

In operation, the device is mounted adjacent to the tooth grinding wheel, which is in the present showing indicated at A, and as the saw blade is intermittently moved under the grinding wheel, the teeth after they have been ground or sharpened, will contact the file pieces 27 and 12, the file section or file piece 12 engaging the usual bur formed at the side of the saw teeth, removing the bur from the saw teeth, as the saw blade is moved during the grinding operation.

From the foregoing it will be seen that due to the construction shown and described, the burs which are usually formed on the side and cutting edges of the saw teeth, are simultaneously removed from the teeth, with the grinding operation, with the result that when the grinding operation has been completed, the saw teeth will have been dressed and the saw is ready for further use without further hand filing.

Due to the construction of the supporting posts and frame of the machine, it is obvious that the file pieces together with their blocks may be properly adjusted to condition saw teeth of various sizes and shapes to insure the effective dressing of the teeth of the saw with the device during the grinding.

Having thus described the invention, what is claimed is:

A band saw tooth dressing device comprising a body portion, means for securing the body portion to the frame of a band saw tooth grinding machine, a horizontally adjustable file block mounted on the body portion, a file section carried by said file block adapted to contact the side faces of saw teeth sharpened by the machine, for dressing the teeth, a plurality of vertical and horizontal posts mounted on the body portion, adjustable blocks on said posts, a bar rigidly connected with one of said posts, disposed in spaced relation with the teeth of the saw blade, a pivoted file block connected with the lower end of the post supporting the bar, yieldable means between the bar and pivoted file block for urging the pivoted file block towards the teeth, and a file piece mounted on the pivoted file block for contact with the cutting edges of the teeth for dressing the cutting edges of the teeth.

VERNARD P. FISHER.
LOUIS H. POOLE.

REFERENCES CITED

The following references are of record in the file of this patent:

UNITED STATES PATENTS

| Number | Name | Date |
| --- | --- | --- |
| 343,785 | Wolcott | June 15, 1886 |
| 366,215 | Georgia | July 12, 1887 |
| 382,467 | Georgia et al. | May 8, 1888 |
| 436,059 | Jordan et al. | Sept. 9, 1890 |
| 440,163 | Karshner | Nov. 11, 1890 |
| 1,501,112 | Hartwig | July 15, 1924 |
| 1,844,330 | Medholdt | Feb. 9, 1932 |
| 1,866,101 | Hach et al. | July 5, 1932 |
| 1,866,102 | Hach | July 5, 1932 |
| 2,199,325 | Taylor | Apr. 30, 1940 |